United States Patent

Goto et al.

[11] Patent Number: 5,752,352
[45] Date of Patent: May 19, 1998

[54] WINDOW MOLDING FOR AUTOMOBILES

[75] Inventors: Shinichi Goto, Gifu-ken; Masao Kobayashi, Aichi-ken; Hiroshi Iwasaki, Aichi-ken; Sadao Nada, Aichi-ken, all of Japan

[73] Assignee: Toyoda Gosei Co., Ltd., Aichi, Japan

[21] Appl. No.: 671,944

[22] Filed: Jun. 28, 1996

[30] Foreign Application Priority Data

Jun. 29, 1995 [JP] Japan ................... 7-163931

[51] Int. Cl.⁶ ................... E06B 3/00; B60J 1/02
[52] U.S. Cl. ................... 52/208; 52/204.957; 52/716.5; 52/716.2; 296/93; 296/146.15; 296/208; 49/490.1
[58] Field of Search ................... 52/208, 716.5, 52/716.2, 204.957, 204.951; 296/93, 146.15, 208; 49/490.1, 489.1

[56] References Cited

U.S. PATENT DOCUMENTS

| | | | |
|---|---|---|---|
| 4,880,674 | 11/1989 | Shimizu | 52/716.5 X |
| 4,974,901 | 12/1990 | Katayama | 52/716.5 X |
| 5,074,610 | 12/1991 | Tamura et al. | 296/93 |
| 5,170,587 | 12/1992 | Nakatani et al. | 49/490 |
| 5,273,338 | 12/1993 | Gooding et al. | 296/146.15 |
| 5,395,563 | 3/1995 | Goto et al. | |
| 5,441,688 | 8/1995 | Goto et al. | |
| 5,456,049 | 10/1995 | Goto et al. | |

FOREIGN PATENT DOCUMENTS

| | | | |
|---|---|---|---|
| 58-156414 | 9/1983 | Japan | 296/93 |
| 62-218220 | 9/1987 | Japan | 296/93 |
| 5-16668 | 1/1993 | Japan | 296/146.15 |
| 5-147438 | 6/1993 | Japan | 296/93 |
| 5-330337 | 12/1993 | Japan | 296/93 |

*Primary Examiner*—Carl D. Friedman
*Assistant Examiner*—Winnie S. Yip
*Attorney, Agent, or Firm*—Cushman Darby & Cushman IP Group of Pillsbury Madison & Sutro, LLP

[57] ABSTRACT

An automobile window molding includes an elongated leg having an embedded core member, an outer head portion having a contact portion, an inner support portion, a seal lip and a position control portion. The molding is suited to position a window in a supporting window frame. The head portion is integrally formed at an upper end of the leg and extends over a portion of the front widow glass. The contact portion is defined by a projection positioned between the head portion and the inner support portion so as to touch the end surface of the front window glass. The inner support portion is formed at a lower end of the leg and is configured to touch an inner surface of the front window glass. The perimeter of the front window glass is held between the head portion and the inner support portion. At least one seal lip is formed on the leg so as to contact a window frame. The position control portion is preferably bent towards the window glass, such that the projection is disposed to be closer to the inner support portion than to the core member.

15 Claims, 2 Drawing Sheets

5,752,352

WINDOW MOLDING FOR AUTOMOBILES

The priority application, Japanese Patent Application No. Hei 7-163931, filed in Japan on Jun. 29, 1995, is hereby incorporated by reference into the present specification.

BACKGROUND OF THE INVENTION

1. Field of the Invention

This invention relates to molded articles and more particularly to automobile window moldings which are insertable into a gap defined between a front window glass (or windshield) and a supporting window frame of a vehicle.

2. Description of Related Art

As shown in FIGS. 1 and 2, a synthetic resin window molding, generally designated by reference numeral 20, is extruded as an elongated member having a particular cross-sectional shape. That shape employs a plate-like and elongated leg 22 that is configured to extend about a window edge and into a gap 14 between a front window glass 12 and a window frame 10. A core member 24 is embedded along the molding 20 adjacent the top of the leg 22. The molding shape also has a plate-like and elongated head portion 26 formed at the top end of leg 22. A wide contact portion 28, disposed at one end of the leg 22, extends outward from the head portion 26. The head portion 26 and the contact portion 28 fit around and along a side of the front windshield 12 and are constructed to attach to a front surface of that front window glass 12. A support portion 30 extends outwardly from the opposite end of the leg 22 and together with the head portion 26 and the contact portion 28 define a shaped body. The support portion 30 attaches to the back surface of the front window glass 12. The contact portion 28 and the support portion 30 sandwich the perimeter of the front window glass 12 therebetween. A first lip 32 and a second lip 34 extend out from the side of leg 22 adjacent the window frame 10. Where the first lip 32 joins the leg 22, the molding 20 includes a tubular portion 36 which permits the shape of the first lip 32 to change easily.

To mount a window using the window molding 20, shown in FIGS. 1 and 2, the leg 22, the support portion 30, the first lip 32 and the second lip 34 are inserted into the gap 14 between the front window glass 12 and the window frame 10. When the window molding is properly mounted, the contact portion 28 of the head portion 26 touches the front surface of the front window glass 12 and a tip of the support portion 30 touches the back surface of the front window glass 12 and wraps around the perimeter of the front window glass 12. The first lip 32 and the second lip 34 touch an inside surface of the window frame 10. When inserting the window molding 20 into the gap 14, the first lip 32 and the second lip 34 push the leg 22 toward the front window glass 12. Therefore, the window molding 20 is held in a fixed position in the window frame 10. A gutter 38, having a water draining function, is formed between the right side of the head portion 26 and the inside surface of the window frame 10. Further, the first lip 32 is formed lower down on the leg 22 than the head portion 26.

When the leg 22 is inserted into the gap 14 between the front window glass 12 and the window frame 10, it is difficult for an installer to know when the molding 20 is fully inserted; the molding 20 does not transmit any sensation or provide any indication that proper insertion has occurred. A balance of the leg 22 in the gap 14 may get worse. Therefore, workers often push the leg 22 and the support portion 30 into the gap 14 too far in an attempt to ensure that the leg 22 is fitted into the gap 14. As shown in FIG. 2, the end of the leg 22 and the support portion 30 are pushed past the front surface of the front window glass 12. In this case, the window molding 20 is not held in a formal position and the leg 22 will be positioned adjacent the front window glass 12 in an inclined condition. Consequently, the mounting of the window molding 20 relative to both the window and the frame may be unacceptable.

SUMMARY OF THE INVENTION

It is an object of the invention to provide a window molding for automobiles that is configured to prevent the molding from being inserted too far into a gap defined between a front window glass and window frame and that can be easily positioned adjacent the front window glass. Such prevention occurs because the molding of the present invention will provide an indication of when proper mounting has taken place.

In accordance with an embodiment of the present invention, this and other objects are achieved by providing an automobile window molding comprising an elongated leg member having an embedded core member, a head portion (or elongated outer support member) having a contact portion, a support portion (or elongated inner support member), lip members and a position control portion. The leg member is adopted to be inserted in a gap between a front window glass and an adjacent window frame. The core member is embedded in the leg. The head portion has a proximal end integrally formed at an upper end of the leg and is exposed at a front surface of the front window glass. The contact portion is formed at the outer distal end of the head portion and contacts the front surface of the front window glass. The support portion has a proximal end formed at the bottom end of the leg and an inner distal end that touches the back surface of the front window glass. The perimeter of the front window glass is held between the contact portion and the support portion. The lip members are formed to extend outwardly from the window frame side of the leg member (i.e., the rear surface of the leg member) and touch the inside surface of the window frame. The leg member has a front surface and rear surface with the front surface including a position control portion fixed there along, preferably at a point centered between the contact portion and the support portion. Further, the leg is itself preferably formed from upper and lower segments that are angled relative to each other to define a bent leg having a substantially V-shaped configuration. Most importantly, the front surfaces of the upper and lower segments are angled with respect to each other to converge at a projection that extends along the front surface of the molding. The projection is configured and arranged to contact the end of the window glass and permit the molding to pivot there around, is horizontally positioned to be closer to and above the window rear surface engaging portion of the support portion, and is spaced farther from and below the embedded core member. The projection also is located vertically ahead of both the core member and the point at which the support portion meets the leg.

The window molding for automobiles further includes a gap which defines a space between the contact portion side of the leg and the edge of the front window glass.

When inserting the window molding into a gap between the periphery of a front window glass and an adjacent window frame, the support portion, the lip member, and the position control portion are also inserted into the gap. When the support portion reaches a corresponding position of the back surface of the front window glass, the support portion touches the back surface of the front window glass and the contact portion touches the edge of the front window glass. Therefore, the window molding holds the perimeter of the front window glass and the installation of the window molding is finished. The position control portion between the contact portion and support portion touches an edge of the front window glass at this time. Workers can feel when the desired insertion position is achieved by sensing the pivoting action of the molding when the support portion snaps into place along the rear surface of the window glass and the contact portion rotates into position against the glass front surface.

These and other objects, features, characteristics, and advantages of the present invention will become apparent upon consideration of the following description and the appended claims with reference to the accompanying drawings, all of which form a part of the specification which illustrate, by way of example, the principles of the present invention.

DESCRIPTION OF THE PREFERRED EMBODIMENT

Figure 4:
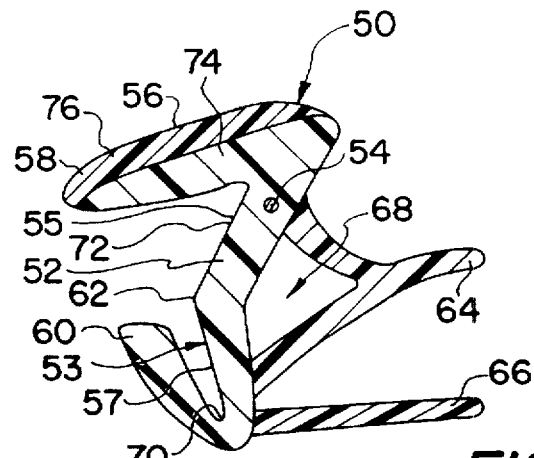
FIG. 4 is a sectional view of a window molding of the present invention.

A window molding, generally designated by reference numeral 50, of this embodiment is continuously extruded with a cross-sectional shape (or profile) such as shown in FIG. 4. The window molding 50 comprises a vertical leg 52, which is mountable within a gap 14 defined between a front window glass 12 and a window frame 10, and a head portion 56. A core member 54, for example copper wire, is embedded in an upper portion of the leg 52 and extends along the molding 50.

The head portion 56 (or outer support member) includes an inside portion 74 (or proximal end portion) disposed at an upper end of the leg 52 and extending outwardly from a front side of the leg 52, and a surface layer 76 covering the inside portion 74 in such a manner as to permit the surface layer 76 to serve as a decorative surface. The distal end of the head 56 that overlies the front or inner surface 12a of the front window glass 12 is a contact portion 58.

The window molding 50 further comprises an inner support portion 60 located at a lower end of leg 52, a first lip 64 and a second lip 66. Both the first and second lips 64 and 66 extend outwardly from the rear side of the leg 52, which is opposite to the front surface from which the support portion 60 extends. The first lip 64 has a substantially tubular portion 68 at the base.

The leg 52 has a substantially V-shaped configuration, which is shaped to be bent toward the front window glass 12.

Figure 1:
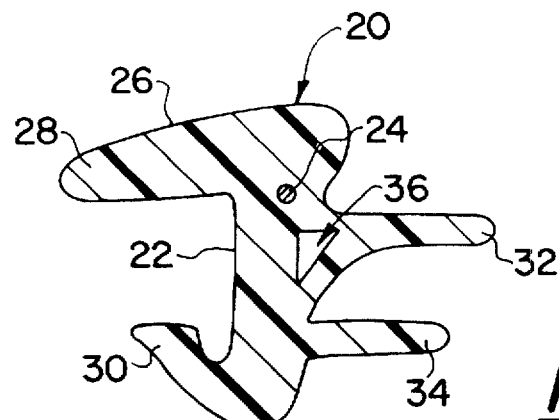
FIG. 1 is a sectional view of a conventional window molding.
Figure 5:
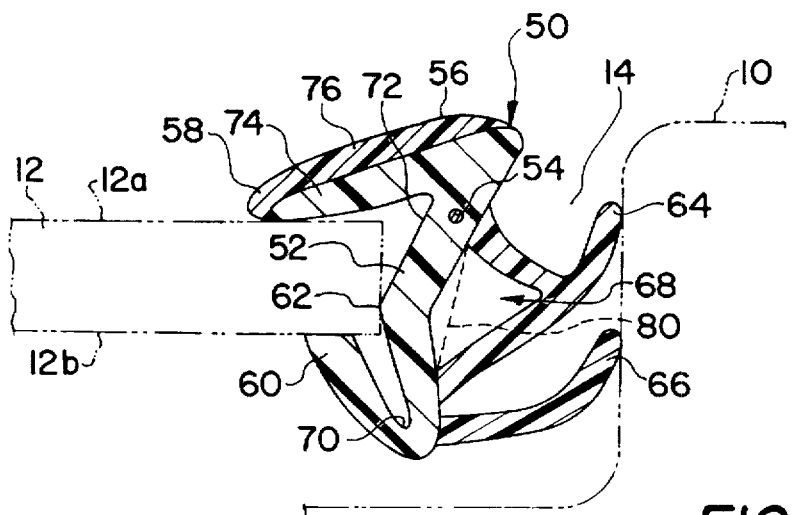
FIG. 5 is a sectional view showing the condition of fixing the window molding of the invention into a gap between a front window glass and a window frame.

The bent portion of the center leg 52 also includes a central position control portion or projection 62 located between the points where contact portion 58 and the support portion 60 intersect the leg 52. The forward projection 62 touches an end of the front window glass 12 when the molding 50 is mounted between the windshield 12 and window frame 10. As shown in FIG. 5, from a horizontal viewpoint, projection 62 is positioned closer to the support portion 60 than to the core member 54. An opening or first gap 72 is created between the contact portion 58 and the projection 62. The substantially tubular portion 68 has a substantially four-sided shape including the upper and lower rear surfaces of the leg 52 defined by the bent shape of the leg 52. An acute angle open portion 70 is formed between the lower front surface of the leg 52 and the support portion 60. The open portion 70 facilitates the bending of the support portion 60 toward the leg 52. A total thickness of the leg 52 and the support portion 60 is reduced, i.e., becomes thinner, in proximity to the acute angle portion 70. The thickness of the leg 52 at the bottom end is preferably thinner than the thickness of a conventional leg 22 at a corresponding position as in FIG. 1 for example, by the dimension of about 1 mm.

If the gap 14, which is defined between the front window glass 12 and the window frame 10, is smaller than would be usual for standard production variations of the gap 14 it is still easy to insert the leg 52, the support portion 60, the first lip 64 and the second lip 66 into the gap 14.

The inside portion 74, the leg 52 and the support portion 60 are preferably comprised of a resin, for example, a 90 degree hardness polyvinyl chloride that is not soft and not rigid but exhibits some degree of flexibility so that the support portion 60 can spring out along the window rear or outer surface 12b of the front window glass 12. The surface layer 76 and the contact portion 58 are each composed of a softer resin than the resin used for the inside portion 74, for example, a 75 degree hardness bridge formation polyvinyl chloride. The first lip 64 and the second lip 66 are each composed of a high friction coefficient resin, for example, chlorinated ethylene, to thereby prevent both slippage or any scratching along the inside of the window frame 10.

The window molding 50 is extruded using the above-mentioned resins through an extrusion head disposed on a core for forming the tubular portion 68.

The leg 52, having the position control portion 62 on its front surface, the support portion 60, and the first lip 64 and the second lip 66 are inserted into the gap 14 between the edge of the front window glass 12 and the window frame 10. When inserting the molding 50 into the gap 14, the first lip 64 and the second lip 66 touch the perimeter of the inside of the window frame 10, while the projection 62 and the support portion 60 touch the front window glass 12. The projection 62 and the support portion 60 are pushed toward each other during insertion. That is, as the support portion 60 is pushed between the perimeter of the front window glass 12 and the inside of the window frame 10, the support portion 60 is elastically deformed and thereby displaced next to the front surface of leg 52. The elastic deformation of the support portion 60 is facilitated by the presence of the acute angle portion 70. When the distal end of the support portion 60 moves past the end of window glass 12, the contact portion 58 touches the front or upper surface 12a of the front window glass 12. The support portion 60 and the contact portion 58 contact the perimeter of the front window glass 12. The first lip 64 and the second lip 66 touch the inside of the window frame 10 elastically. The leg 52 maintains its position, pushing the front window glass 12 by an elastic repulsive force.

At the same time, the projection 62 touches the end surface of the front window glass 12 by the elastic repulsive force of the first lip 64 and the second lip 66. Therefore, workers can feel when the molding is properly positioned. Also, the position control portion 62, the first lip 64 and the second lip 66 support the leg 52 from opposite sides thereby creating a balanced condition of the leg 52 in the gap 14. Consequently, the leg 52 is prevented from being inserted too far into the gap. Therefore, the window molding 50 is maintained in the correct position.

Figure 2:
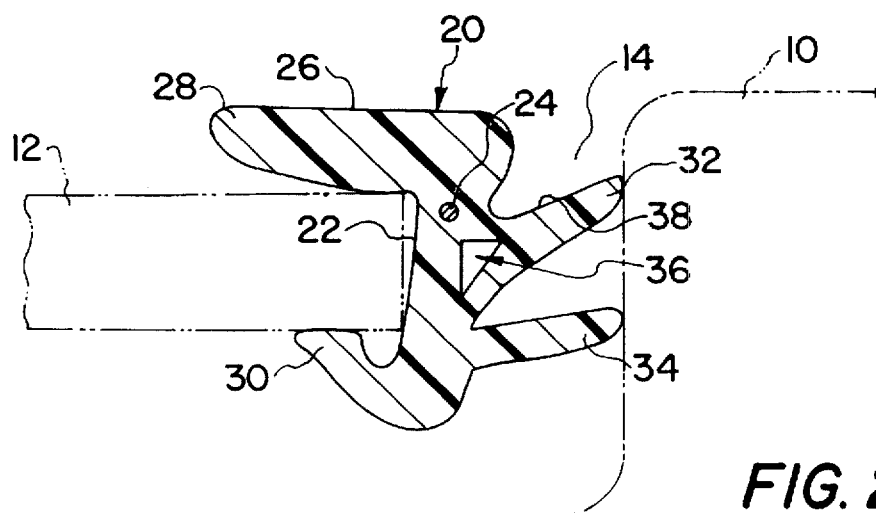
FIG. 2 is a sectional view showing the condition of fixing the conventional window molding into a gap between a front window glass and a window frame.
Figure 3:
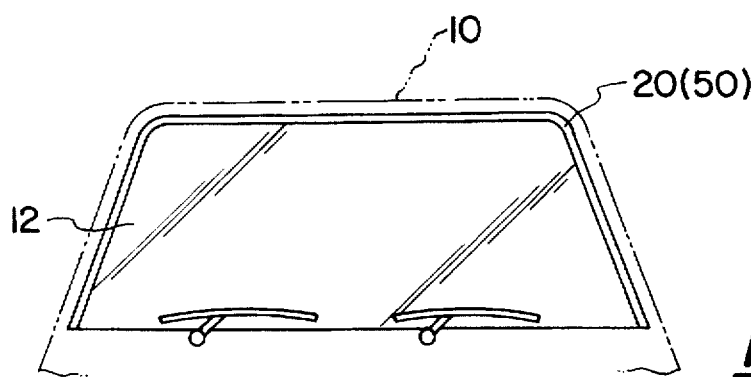
FIG. 3 is a front view showing the condition of fixing the window molding into a gap between a front window glass and a window frame.

As noted above, the projection 62 is disposed vertically closer to the support portion 60 than to the core member 54. The projection 62 defines a center rotational point for the molding 50 when assembling. Further, the lower end of the leg 52 provides an added rotational force directed toward the window frame 10 by the elastic force of the first lip 64 and the second lip 66 when those lips 64 and 66 are in contact with the window frame 10. The window molding 50 is thereby maintained in the correct position and this rotation of the molding 50 not only completes insertion, but permits the contact portion 58 to be rotated into contact with the window glass 12, thereby eliminating the open space problem shown in FIG. 2 where the portion 28 is spaced above, not in contact with, the window glass 12. The front surface 53 includes an upper portion 55 and a lower portion 57 on opposite sides of projection 63. It can be seen in FIG. 4 that relative to the lower portion 57, the upper portion 55 is angled rearwardly about 40°. This rearward angle defines the open area 72 and permits the pivoting of the molding 50 relative to the window glass 12.

The opening area 72 above projection 62 provides room for this pivoting to occur and for the upper part of the leg 52 to easily move toward the front window glass 12.

Also, during assembling on an automobile, the tubular portion 68 can be compressed as the first lip 64 is pushed against the frame 10. Therefore, it is easier to insert the leg 52 into the gap 14. Since the thickness of the leg 52 is relatively thin and has a bent shape, and due to the provision of the acute angle portion 70 which permits the easy bending of the support portion 60, it is easier to insert the molding 50 into the gap 14. After support portion 60 has snapped into the position shown in FIG. 5 and lies against the lower surface 12b of the window glass 12, the support portion 60 is positioned on the inner surface 12b of the glass window 12 at a point that is about the same as with the conventional molding.

When the leg 52 is inserted, the force of insertion is applied to molding 50 in a slanted direction relative to the leg 52, not in a vertical direction. The insertion direction and the slanted direction of the leg 52 above the projection 62 are substantially in the same direction. Therefore, it is easier to insert the leg 52 into the gap 14. The thickness of the leg 52 at the bottom end is preferably thinner than the thickness of the conventional leg 22 at a corresponding position in FIG. 1.

As another embodiment, the front surface of leg 52 can be formed in a V-shape having a projection 62 as in the previous embodiment while the rear surface of the leg 52 would be substantially flat or plate-like as shown by dotted line 80 in FIG. 5. This embodiment also has the same function and same results the aforementioned embodiment.

Figure 6:
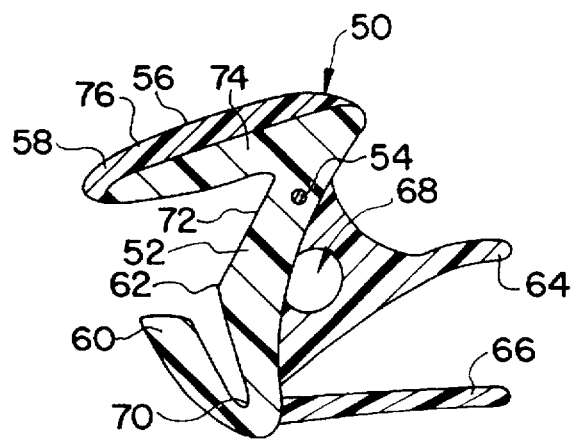
FIG. 6 is a sectional view of an alternative embodiment of the window molding of the present invention.

The cross-sectional shape of the tubular portion 68 can also have other shapes such as, for example, triangular, circular (FIG. 6), or rectangular depending upon the way the rear surface of leg 56 is formed. Alternatively, the window molding 50 can also function without the tubular portion 68.

Further, the contact portion 58 may be formed from the leg 52 to have a shape that can serve as a gutter to control water flow there along. Additionally, the molding 50 can be formed with only one seal lip, similar to either the first or second seal lips 64 and 66, rather than employing a plurality of lips.

While the invention has been described in connection with what are presently considered to be the most practical and preferred embodiments, it is to be understood that the invention is not to be limited to the disclosed embodiments, but to the contrary, is intended to cover various modifications and equivalent arrangements included within the spirit and scope of the appended claims.

What is claimed is:

1. A molded article for positioning a windshield in a vehicular structure, said molded article comprising:

an elongated leg member having upper and lower ends and including an embedded core member, said elongated leg member having a substantially V-shaped cross-sectional profile with front and rear surfaces, said front surface including upper and lower front surfaces that converge to define a projection;

an elongated outer support member having a proximal end integrally formed at said upper end and an outer distal end spaced from said upper front surface to define a first gap between an inner surface of said elongated outer support member and said upper front surface;

an elongated inner support member having a proximal end integrally formed at said lower end and an inner distal end spaced from said lower front surface to define a second gap between an inner surface of said elongated inner support member and said lower front surface, said inner distal end being spaced from said outer distal end to define a third gap therebetween; and at least one first elongated lip member extending outwardly from said rear surface of said elongated leg member, wherein said molded article is constructed and arranged to permit a windshield to be inserted into said third gap so that said projection contacts an edge of said windshield while said inner distal end contacts an inner surface of the windshield, and to thereafter permit movement of the windshield relative to said upper front surface so that said molded article pivots about said projection to bring said outer distal end into contact with an outer surface of the windshield while maintaining contact between the windshield and both said inner distal end and said projection.

2. A molded article according to claim 1, wherein said elongated outer support member comprises an outer layer having an outer surface which faces away from the windshield when the windshield is inserted into said third gap.

3. A molded article according to claim 1, wherein said outer surface of said outer layer is formed from at least one soft resin.

4. A molded article according to claim 1, wherein said elongated leg member is formed from at least one flexible resin.

5. A molded article according to claim 1, wherein said upper and lower front surfaces are positioned at about a 40° angle with respect to each other.

6. A molded article according to claim 1, wherein said molded article further comprises at least one second elongated lip member extending outwardly from said rear surface of said elongated leg member.

7. A molded article according to claim 6, wherein at least one of said first and second elongated lip members has a base portion in proximity with said rear surface of said leg member, said base portion having an elongated hollow tubular portion formed therein.

8. A molded article according to claim 7, wherein a cross-sectional shape of said tubular portion is defined by a plurality of surfaces.

9. A molded article according to claim 8, wherein said cross-sectional shape of said tubular member is diamond-like.

10. A molded article according to claim 8, wherein said cross-sectional shape of said tubular member is triangular.

11. A molded article according to claim 7, wherein said cross-sectional shape of said tubular member is circular.

12. A molded article according to claim 1, wherein said lip member is formed from at least one high frictional coefficient material.

13. A molded article according to claim 1, wherein said projection is positioned closer to said elongated inner support member than to said core member.

14. A molded article according to claim 1, wherein each of said upper and lower front surfaces are positioned at an acute angle with respect to the edge of the windshield when the windshield is positioned to contact said projection and said inner and outer distal ends.

15. A molded article according to claim 1, wherein said inner surface of said elongated outer support member is positioned at an acute angle with respect to the outer surface of the windshield when the windshield is positioned to contact said projection and said inner and outer distal ends.

* * * * *